United States Patent Office 3,342,766
Patented Sept. 19, 1967

3,342,766
POLYMERIZATION PROCESS EMPLOYING SILOX-
ANE-OXYALKYLENE BLOCK COPOLYMERS
Dexter P. Huntington, Tonawanda, N.Y., assignor to
Union Carbide Corporation, a corporation of New
York
No Drawing. Filed Jan. 12, 1965, Ser. No. 425,068
12 Claims. (Cl. 260—29.6)

This application is a continuation-in-part of my co-pending application Ser. No. 168,513 filed on Jan. 24, 1962, now abandoned.

This invention relates to coating compositions containing organosilicone copolymers. This invention also relates to an improved liquid phase polymerization process utilizing organosilicone copolymers.

In general, coating compositions (e.g., paints, lacquers and varnishes) are composed of an organic compound capable of forming a polymeric coating (e.g., a vinyl chloride resin) mixed with a liquid diluent (i.e., water or a liquid organic diluent). Many such coating compositions (e.g., aqueous vinyl halide latices) are produced by polymerizing a monomer that has been dissolved in, emulsified with or suspended in a liquid diluent to produce a coating-forming polymer in the diluent. It is known that the later-mentioned coating compositions are oftentimes difficult to prepare owing to the incompatibility of the monomer or polymer and the diluent. Organic surfactants or emulsifiers are generally used to overcome this problem. Similarly, the problem of incompatibility of components of coating compositions often exists in compositions produced by mixing pre-formed coating-forming polymers and diluents. In coating compositions produced by any of the above-mentioned techniques, additional incompatibility problems are often presented by the tendency of pigments in the composition to separate from the other components ("float"). Although compatibility of these various components may be achieved to some extent by the use of various additives (e.g., emulsifying agents), the resulting coating compositions are oftentimes still not satisfactory owing to their poor viscosity characteristics. That is, some coating compositions are too fluid and tend to flood the surface to be coated while other coating compositions are too viscous and must be diluted in order to be spread readily over the surface to be coated. Moreover, many coating compositions foam excessively, particularly when heated. Other coating compositions do not adequately wet the surface to be coated while some coating compositions have poor leveling properties and still others produce coatings marred by "fisheyes."

It is well known that organic surfactants and emulsifiers may be used for the solution, emulsion or suspension polymerization of organic monomers.

Organic surfactants are the accepted emulsifying agents for current commercial polymerization. The monomers generally polymerized by an emulsion procedure are: vinyl acetate, acrylates (methyl, ethyl, butyl), styrene, acrylonitrile, acrylic acid, methyl methacrylate, ethylhexylacrylate, and olefins, such as ethylene, propylene and butadiene.

There are, however, at least two known deficiencies in using organic emulsifiers. First, large quantities of organic surfactants are required in order to form the emulsion. After the polymer has been formed the large quantity of the organic surfactant remains as a contaminant and causes the product to have poor water resistance and low hardness. Second, organic emulsifying agents are known to cause severe foaming problems in production and application of the resultant emulsion.

It is also known that dihydrocarbyl polysiloxanes may be used in emulsion polymerization. However, their use leads to relatively large amounts of "scrap," i.e., coagulated polymer.

It is an object of this invention to provide coating compositions whose preparation or use is free of one or more of the above-mentioned difficulties encountered in the preparation and use of conventional coating compositions.

It is a further object of this invention to provide an improved liquid phase polymerization process which is free of one or more of the above-mentioned difficulties encountered when organic surfactants or emulsifiers or dihydrocarbyl polysiloxanes are used in conventional liquid phase polymerization processes.

This invention is based, in part, on the discovery that block copolymers containing a siloxane moiety linked to a polyoxyalkylene moiety by a silicon to carbon bond overcome the above-mentioned problems involved in the production and use of coating compositions. This invention provides a coating composition comprising (1) from 1 to 75 parts by weight of an organic compound capable of forming a polymeric coating, (2) from 0.001 to 30 parts by weight of a block copolymer composed of (a) at least one siloxane block containing at least two siloxane units represented by the formula:

$$R_bSiO_{4-b/2}$$

wherein R contains from one to about twenty-two carbon atoms inclusive and is selected from the class consisting of monovalent hydrocarbon groups and divalent hydrocarbon groups and b has a value from 1 to 3 inclusive, said siloxane block containing at least one of said siloxane units wherein at least one R group is a divalent hydrocarbon group, and (b) at least one oxyalkylene block containing at least two oxyalkylene groups represented by the formula —R′O—, wherein R′ is an alkylene group containing from two to about ten carbon atoms inclusive, said siloxane and oxyalkylene blocks being interconnected by said divalent hydrocarbon group, said copolymer containing from 5 to 95 parts by weight of siloxane blocks per 100 parts by weight of the copolymer and from 5 to 95 parts by weight of the oxyalkylene blocks per 100 parts by weight of the copolymer, and (3) from 20 to 98.999 parts by weight of a liquid diluent, selected from the group consisting of water and liquid organic diluents, said parts by weight being based on 100 parts by weight of the composition.

By utilizing the above-described block copolymers as surfactants or emulsifying agents in liquid phase polymerization processes, the inherent problems associated with the use of organic surfactants and emulsifiers or dihydrocarbyl polysiloxanes can be diminished or eliminated.

It has been discovered that these block copolymers can be used as replacements for all or part of the organic surfactants to provide stable polymer compositions of fine particle size and low foaming. It has also been found that less block copolymer is required to provide an acceptable stable polymer composition than if an organic surfactant had been used. Similarly, the block copolymers can be used as replacements for all or part of the dihydrocarbon polysiloxanes to provide polymer compositions having very little or no "scrap," i.e., coagulated polymer.

The improved liquid phase polymerization process of this invention comprises forming a liquid phase reaction mixture comprising (1) from 1 to 75 parts by weight of at least one olefinically unsaturated organic compound which undergoes polymerization in a liquid phase reaction mixture to form a high molecular weight polymer, (2) from 0.001 to 30 parts by weight of a block copolymer composed of (a) at least one siloxane block containing at least two siloxane units represented by the formula:

$$R_bSiO_{4-b/2}$$

wherein R contains from one to about twenty-two carbon atoms inclusive and is selected from the class consisting of monovalent hydrocarbon groups and divalent hydrocarbon groups and $b$ has a value from 1 to 3 inclusive; said siloxane block containing at least one of said siloxane units wherein at least one R group is a divalent hydrocarbon group, and (b) at least one oxyalkylene block containing at least two oxyalkylene groups represented by the formula —R'O—, wherein R' is an alkylene group containing from two to about ten carbon atoms inclusive, said siloxane and oxyalkylene blocks being interconnected by said divalent hydrocarbon group, said copolymer containing from 5 to 95 parts by weight of siloxane blocks per 100 parts by weight of the copolymer and from 5 to 95 parts by weight of the oxyalkylene blocks per 100 parts by weight of the copolymer, and (3) from 20 to 98.999 parts by weight of a liquid diluent selected from the group consisting of water and liquid organic diluents, said parts by weight being based on 100 parts by weight of said liquid phase reaction mixture; and subjecting each such olefinically unsaturated organic compound to polymerization in said liquid phase reaction mixture to produce said polymer dispersed in said diluent.

The copolymers useful in the coating compositions and improved liquid phase polymerization process of this invention are of the class that are known as "block" copolymers. Block copolymers are composed of at least two sections or blocks, at least one section or block composed of one type of recurring units or groups (e.g., siloxane groups as in the copolymers useful in this invention) and at least one other section or block composed of a different type of recurring units or groups (e.g., oxyalkylene groups as in the copolymers useful in this invention). Block copolymers can have linear, cyclic or branched (crosslinked) structures.

The siloxane blocks in the copolymers employed in the coating compositions and polymerization process of this invention contain at least two siloxane groups that are represented by the formula:

$$R_bSiO_{4-b/2} \quad (1)$$

wherein R is a monovalent hydrocarbon group or a divalent hydrocarbon group and $b$ has a value from 1 to 3 inclusive. Preferably, R contains from 1 to about 22 carbon atoms inclusive. The groups represented by R can be the same or different in any given siloxane group or throughout the siloxane block, and the value of $b$ in the various siloxane groups in the siloxane block can be the same or different. The divalent hydrocarbon groups represented by R link the siloxane block to the oxyalkylene block. Each siloxane block contains at lease one group represented by Formula 1 wherein at least one group represented by R is a divalent hydrocarbon group. The siloxane block has a ratio of hydrocarbon groups to silicon atoms from 1:1 to 3:1 inclusive.

Illustrative of the monovalent hydrocarbon groups that are represented by R in Formula 1 are the alkenyl groups (for example, the vinyl and the allyl group); the cycloalkenyl groups (for example, the cyclohexenyl group); the alkyl groups (for example, the methyl, ethyl, isopropyl, octyl and dodecyl groups); the aryl groups (for example, the phenyl and naphthyl groups); the aralkyl groups (for example, the benzyl and the phenylethyl groups); the alkaryl groups (such as the styryl, tolyl and n-hexylphenyl groups); and the cycloalkyl groups (for example, the cyclohexyl group).

Illustrative of the divalent hydrocarbon groups represented by R in Formula 1 are the alkylene groups (such as the methylene, ethylene, propylene, butylene, 2,2-dimethyl-1,3-propylene and decylene groups), the arylene groups (such as the phenylene and p,p′-diphenylene groups), and the alkarylene groups (such as the phenylethylene group). Preferably, the divalent hydrocarbon group is an alkylene group containing from two to four successive carbon atoms. Siloxane groups containing di- valent hydrocarbon groups as substituents are illustrated by groups having the formulas:

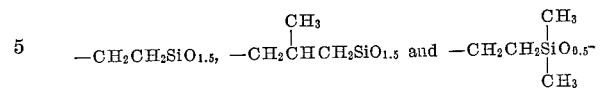

These divalent hydrocarbon groups are linked to a silicon atom of the siloxane block by a silicon-to-carbon bond and to an oxygen atom of the oxyalkylene block by a carbon-to-oxygen bond.

The siloxane block can contain siloxane groups that are represented by Formula 1 wherein either the same hydrocarbon groups are attached to the silicon atoms (e.g., the dimethylsiloxy, diphenylsiloxy and diethylsiloxy groups) or different hydrocarbon groups are attached to the silicon atoms (e.g., the methylphenylsiloxy, phenylethylmethylsiloxy and ethylvinylsiloxy groups).

The siloxane block in the copolymers useful in the coating compositions and polymerization process of this invention can contain one or more types of siloxane groups that are represented by Formula 1 provided that at least one group has at least one divalent hydrocarbon substituent. By way of illustration, only ethylenemethylsiloxy groups

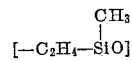

can be present in the siloxane block, or the siloxane block can contain more than one type of siloxane group, e.g., the block can contain both ethylene methylsiloxy groups and diphenylsiloxy groups, or the block can contain ethylenemethylsiloxy groups, diphenylsiloxy groups and diethylsiloxy groups.

The siloxane block contained in the copolymers useful in the coating compositions and polymerization process of this invention can contain trifunctional siloxane groups (e.g., monomethylsiloxane groups, $CH_3SiO_{1.5}$), difunctional siloxane groups (e.g., dimethylsiloxane groups $(CH_3)_2SiO$—), monofunctional siloxane groups (e.g., trimethylsiloxane groups, $(CH_3SiO_{0.5})$), or combinations of these types of siloxane groups having the same or different substituents. Due to the functionality of the siloxane groups, the siloxane block can be predominantly linear or cyclic or crosslinked or it can have combinations of these structures.

The siloxane block contained in the copolymers useful in the coating compositions and polymerization process of this invention can contain organic end-blocking or chain terminating organic groups, in addition to the monofunctional siloxane chain terminating groups encompassed by Formula 1. By way of illustration, the siloxane block can contain such organic end-blocking groups as the hydroxyl group, the aryloxy groups (such as the phenoxy group), the alkoxy groups (such as the methoxy, ethoxy, propoxy and butoxy groups), the acyloxy groups (such as the acetoxy group), and the like.

The siloxane blocks in the copolymers useful in the coating compositions and polymerization process of this invention contain at least two siloxane groups that are represented by Formula 1. Preferably, the siloxane blocks contain a total of from five to twenty siloxane groups that are represented by Formula 1. That part of the average molecular weight of the copolymer that is attributable to the siloxane blocks can be as high as 50,000 but preferably it is from 220 to 20,000. If that part of the average molecular weight of the copolymer that is attributable to the siloxane blocks exceeds 50,000 or if the siloxane blocks contain a total of more than twenty siloxane groups that are represented by Formula 1, the copolymers are usually not as useful, e.g., they may be too viscous for convenient use in the formulations of this invention.

A siloxane block can contain, in addition to the groups represented by Formula 1, siloxane groups represented by the formula:

$$R_e \overset{H_f}{\underset{|}{Si}} O_{4-(e+f)/2} \qquad (1\text{-}a)$$

wherein R has the meaning defined in Formula 1, $e$ has a value from 0 to 2 inclusive, $f$ has a value from 1 to 3 inclusive and $(e+f)$ has a value from 1 to 3 inclusive.

The oxyalkylene blocks in the copolymers employed in the coating compositions and polymerization process of this invention each contain at least two oxyalkylene groups that are represented by the formula:

$$[-R'O-] \qquad (2)$$

wherein R' is an alkylene group. Preferably, the alkylene group represented by R' in Formula 2 contains from two to about ten carbon atoms inclusive, and most preferably from two to three carbon atoms. Illustrative of the oxyalkylene groups that are represented by Formula 2 are the oxyethylene, oxy-1,2-propylene, oxy-1,3-propylene, oxy-2,2-dimethyl-1,3-propylene, oxy-1,10-decylene groups, and the like.

The oxyalkylene blocks in the copolymers useful in the coating compositions and polymerization process of this invention can contain one or more of the various types of oxyalkylene groups represented by Formula 2. By way of illustration, the oxyalkylene blocks can contain only oxyethylene groups or only oxypropylene groups or both oxyethylene and oxypropylene groups, or other combinations of the various types of oxyalkylene groups represented by Formula 2.

The oxyalkylene blocks in the copolymers employed in the coating compositions and polymerization process of this invention can contain organic end-blocking or chain terminating groups. By way of illustration, the oxyalkylene blocks can contain such end-blocking groups as the hydroxy group, the aryloxy group (such as the phenoxy group), the alkoxy groups (such as the methoxy, ethoxy, propoxy and butoxy groups), alkenyloxy groups (such as the vinyloxy and allyloxy groups). Also, a single group can serve as an end-blocking group for more than one oxyalkylene block. For example, the glyceroxy group, $$\begin{matrix} CH_2 & CH & CH_2 \\ | & | & | \\ O & O & O \\ | & | & | \end{matrix}$$

can serve as an end-blocking group for three oxyalkylene chains. The oxyalkylene blocks can also contain trihydro carbonsiloxy end-blocking groups (i.e., $R_3SiO_{0.5}$).

The oxyalkylene blocks in the copolymers useful in the coating compositions and polymerization process of this invention each contain at least two oxyalkylene groups that are represented by Formula 2. Preferably, each block contains from three to thirty of such groups. That part of the average molecular weight of the copolymer that is attributable to the oxyalkylene blocks can vary from 88 [for $(C_2H_4O)_2$] to 200,000, preferably it is from 88 to 15,000. Provided that each oxyalkylene block contains at least two oxyalkylene groups represented by Formula 2, the number of oxyalkylene groups and that part of the average molecular weight of the copolymer that is attributable to the oxyalkylene blocks is not critical, but those copolymers in which that part of the average molecular weight that is attributable to the oxyalkylene blocks exceeds 200,000 or that contain more than fifty oxyalkylene groups per block are less useful, e.g., they are too viscous for convenient use in the formulations of this invention.

The copolymers useful in the coating compositions and polymerization process of this invention can contain siloxane blocks and oxyalkylene blocks in any relative amount. In order to possess desirable properties, the copolymer should contain from 5 parts by weight to 95 parts by weight of siloxane blocks and from 5 parts by weight to 95 parts by weight of oxyalkylene blocks per 100 parts by weight of the copolymer. Preferably, the copolymers contain 5 parts by weight to 50 parts by weight of the siloxane blocks and from 50 parts by weight to 95 parts by weight of the oxyalkylene blocks per 100 parts by weight of the copolymer.

The copolymers useful in the coating compositions and polymerization process of this invention can contain more than one of each of the blocks, and the blocks can be arranged in various configurations such as linear, cyclic or branched configurations. By way of illustration, the following classes of compounds are among the siloxane-oxyalkylene block copolymers useful in the formulations of this invention:

(A) Copolymers that contain at least one unit that is represented by the formula:

$$G'''(OG'')_n OG' \overset{G_c}{\underset{|}{Si}} O_{3-c/2} \qquad (3)$$

(B) Copolymers that contain at least one unit that is represented by the formula:

$$O_{3-c/2}Si G'O(G''O)_n G' \overset{G_c}{\underset{|}{Si}} O_{3-c/2} \qquad (4)$$

(C) Copolymers that cotain at least one unit that is represented by the formula:

$$[G'''(OG'')_n OG'']_2 \overset{G_c}{\underset{|}{Si}} O_{2-c/2} \qquad (5)$$

In the above Formulas 3, 4, and 5, G is a monovalent hydrocarbon radical, G' is a divalent hydrocarbon radical, G'' is an alkylene radical containing at least two carbon atoms, G''' is a hydrogen atom or a monovalent hydrocarbon radical free of aliphatic unsaturation, and $n$ is an integer having a value of at least two, and $c$ has a value from 0 to 2 inclusive in Formulas 3 and 4 and a value from 0 to 1 inclusive in Formula 5. In Formulas 3, 4 and 5, G can represent the same or different radicals, $n$ preferably has a value from 3 to 30 inclusive and G'' can represent the same or different radicals, i.e., the group $(OG'')_n$ can represent, for example, the groups:

$$-(OC_2H_4)_p-, \quad -(OC_2H_4)_p(OC_3H_6)_q-$$
$$-(OC_3H_6)_p- \text{ or } (OC_2H_4)_p(OC_3H_{16})_q-$$

where $p$ and $q$ are integers having a value of at least one.

The monovalent hydrocarbon radicals represented by G in Formulas 3, 4 and 5 can be saturated or olefinically unsaturated or can contain benzenoid unsaturation. Illustrative of the monovalent hydrocarbon radicals represented by G are the linear aliphatic radicals (e.g., the methyl, ethyl and decyl radicals), the cycloaliphatic radicals (e.g., the cyclohexyl and the cyclopentyl radicals), the aryl radicals (e.g., the phenyl, tolyl, xylyl and naphthyl radicals), the aralkyl radicals (e.g., the benzyl and beta-phenylethyl radicals), the unsaturated linear aliphatic radicals (e.g., the cyclohexenyl radical).

Preferably, the G and G' groups [included in the definition of R in Formulas 1 and 1a above] contain from one to about 22 carbon atoms inclusive and the G'' groups [included in the refinition of R' in Formula 2 above] contain from two to about ten carbon atoms. When the G''' group is a monovalent hydrocarbon radical free of aliphatic unsaturation it preferably contains from one to about twelve carbon atoms.

Illustrative of the divalent hydrocarbon radicals represented by G' in Formulas 3, 4 and 5 are the alkylene radicals (e.g., the methylene, ethylene, 1,3-propylene, 1,4-butylene and 1,12-dodecylene radicals), the arylene radicals (e.g., the phenylene radical) and alkarylene radicals (e.g., the phenylethylene radicals). In Formulas 3, 4 and 5, G' is preferably an alkylene radical containing at least two carbon atoms.

Illustrative of the alkylene radicals containing at least two carbon atoms represented by G'' in Formulas 3, 4 and 5 are the ethylene, 1,2-propylene, 1,3-propylene, 1,6-hexylene, 2-ethylhexylene-1,6 and 1,12-dodecylene radicals.

Illustrative of the radicals represented by G''' in Formulas 3, 4 and 5 are the saturated linear or branched chain aliphatic hydrocarbon radicals (e.g., the methyl, ethyl, propyl, n-butyl, tert.-butyl and decyl radicals), the saturated cycloaliphatic hydrocarbon radicals (e.g., the cyclopentyl and cyclohexyl radicals), the aryl hydrocarbon radicals (e.g., the phenyl, tolyl, naphthyl and xylyl radicals), and the aralkyl hydrocarbon radicals (e.g., the benzyl and beta-phenylethyl radicals).

The following are representative of the hydrolytically stable siloxane-oxyalkylene block copolymers useful in the coating compositions and polymerization process of this invention. In the formulas, Me represents methyl ($CH_3$—), Et represents ethyl ($CH_3CH_2$—), $\phi$ represents phenyl ($CH_6H_5$—), Bu represents the butyl group ($C_4H_9$—), and $x$ is an integer.

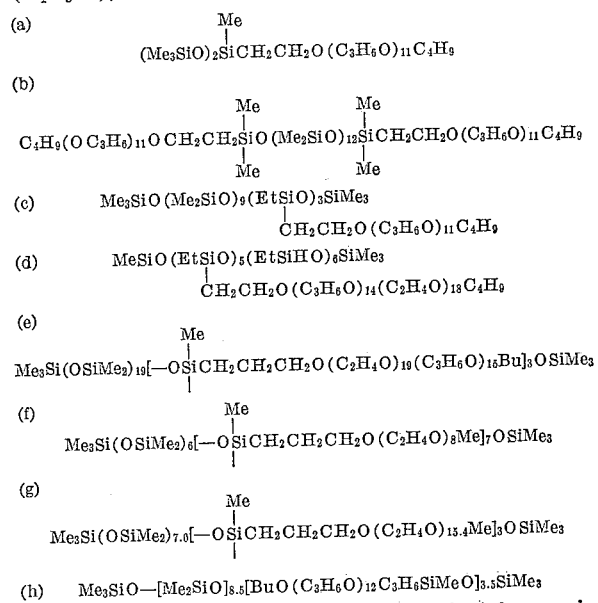

(h)   $Me_3SiO$—$[Me_2SiO]_{8.5}[BuO(C_3H_6O)_{12}C_3H_6SiMeO]_{3.5}SiMe_3$

Block copolymers that are especially suited for use in the coating compositions and polymerization process of this invention are those having the formula:

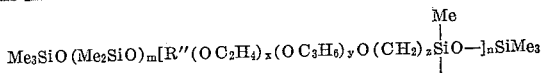

wherein $m$ has a value from 0 to 25 inclusive, $n$ has a value from 1 to 15 inclusive, $x$ has a value from 3 to 25 inclusive, $y$ has a value from 0 to 25 inclusive, $z$ has a value from 2 to 3 inclusive and R'' is an alkyl group containing from 1 to 4 carbon atoms inclusive.

Illustrative of the block copolymers described in the previous paragraph are:

(i)   $Me_3SiO$—$[MeO(C_2H_4O)_7C_3H_6SiMeO]SiMe_3$ (j)   $Me_3SiO$—$[Me_2SiO$—$]_2[MeO(C_2H_4O$—$)_3C_2H_4SiMeO$—$]_{2.8}SiMe_3$ (k)   $Me_3SiO[Me_2SiO]_{21}[BuO(C_2H_4O)_{18}(C_3H_6O)_{14}C_3H_6SiMeO]_{3.5}$—$SiMe_3$ (l)   $Me_3SiO[Me_2SiO]_{8.5}[MeO(C_2H_4O)_{16}C_3H_6SiMeO]_{3.5}SiMe_3$ (m)   $Me_3SiO[MeO(C_2H_4O)_7C_3H_6SiMeO]_{1.5}SiMe_3$ (n)   $Me_3SiO[Me_2SiO]_2[MeO(C_2H_4O)_{16}C_3H_6SiMeO]_{2.8}SiMe_3$ (o)   $Me_3SiO[Me_2SiO]_{8.5}[MeO(C_2H_4O)_7C_3H_6SiMeO]_{3.5}SiMe_3$ (p)   $Me_3SiO$—$[Me_2SiO]_{7.8}[MeO(C_2H_4O)_7C_3H_6SiMeO]_{11}SiMe_3$ (q)   $Me_3SiO[MeO(C_2H_4O)_3C_3H_6SiMeO]SiMe_3$

The siloxane-oxyalkylene block copolymers useful in the compositions and polymerization process of this invention can be prepared by several convenient methods. For example, the copolymers useful in this invention can be produced by a process that involves forming a mixture of a siloxane polymer containing a silicon-bonded, halogen-substituted monovalent hydrocarbon group and an alkali metal salt of an oxyalkylene polymer and heating the mixture to a temperature sufficiently elevated to cause the siloxane polymer and the salt to react to produce the copolymer, and, as a by-product, an alkali metal halide. As a further example, the copolymers can be produced by a process that involves a platinum-catalyzed addition reaction between a siloxane containing silicon-bonded hydrogen atoms and an oxyalkylene polymer containing alkenyloxy (e.g., vinyloxy) end-blocking groups.

The organic compound capable of forming a polymeric coating employed in the compositions of this invention include the various coating-forming materials employed in conventional paints, varnishes, latices, lacquers, enamels, water-based paints, dopes, shellacs, and the like. Illustrative of such compounds are the drying and semi-drying oils (e.g., linseed oil, corn oil, tung oil, perilla oil, fish oil, soybean oil, oiticica oil and dehydrated castor oil), natural varnish and enamel resins (e.g., shellac, rosin, dammar, copal and kauri), synthetic varnish and enamel resins (e.g., oil-soluble phenol aldehyde resins, alkyd resins, phenol-formaldehyde resins and cumar resins), organic rubbers (e.g., butadiene-styrene copolymers, chloroprene polymers, butadiene-acrylonitrile copolymers, isobutylene polymers, isobutylene-isoprene polymers and the like), acrylate and methacrylate resins, cellulose derivatives (e.g., nitrocellulose, cellulose acetate, cellulose acetate-butyrate and ethyl cellulose), amino-organosilicon compounds, epoxy monomers and resins, reaction products of epoxy compounds and amino-organosilicon compounds, urea-formaldehyde resins, melamine-formaldehyde resins, silicone resins (e.g., the methylsiloxane and phenylsiloxane resins) and vinyl halide resins. The organic compound capable of forming a polymeric coating employed in the compositions of this invention can be polymeric or can comprise one or more monomeric compounds capable of polymerizing to produce a coating. A single monomer or polymer or mixtures thereof can be employed.

The vinyl halide polymers which are capable of forming a polymeric coating and which are useful in the coating compositions of the present invention include homopolymeric vinyl halide polymers (e.g., homopolymeric vinyl chloride polymers and homopolymeric vinyl fluoride polymers) and copolymeric vinyl halide polymers (e.g., copolymeric vinyl chloride polymers and copolymeric vinyl fluoride polymers). Suitable copolymeric vinyl halide polymers are preferably composed of at least 60 parts by weight of copolymerized vinyl halide per 100 parts by weight of the polymer and up to 40 parts by weight of another copolymerized olefinically unsaturated compound per 100 parts by weight of the polymer. More desirably, the copolymeric vinyl halide polymers are composed of at least 85 parts by weight of copolymerized vinyl halide per 100 parts by weight of the polymer and up to 15 parts by weight of another copolymerized olefinically unsaturated compound per 100 parts by weight of the polymer. The compounds that can be copolymerized with vinyl halides to produce suitable copolymeric vinyl halide polymers include vinylidene halides (e.g., vinylidene chloride and vinylidene bromide), alkenyl esters of alkanoic acids (e.g., vinyl acetate), alkenyl benzoates (e.g., vinyl benzoate), alkyl acrylates (e.g., methyl acrylate, ethyl acrylate, butyl acrylate and octyl acrylate), alkyl methacrylates (e.g., methyl methacrylate, ethyl methacrylate, butyl methacrylate and octyl methacrylate), dialkyl esters of olefinically unsaturated dicarboxylic acids (e.g., dimethyl maleate and diethyl fumarate), alkenyl cyanides (e.g., acrylonitrile, tetrahaloethylenes (e.g., chlorotrifluoroethylene), amides of olefinically unsaturated aliphatic carboxylic acids (e.g., acryl amide and N,N-dimethyl methacrylamide), aralkenes (e.g., styrene and vinyl naphthylene), alkenyl alkyl ethers (e.g., vinyl methyl ether), alkenyl alkyl ketones (e.g., vinyl methyl ketone), alkanes (e.g., ethylene) and alkenyl substituted heterocyclic compounds (e.g., vinyl pyridine). A single vinyl halide polymer or a mixture of vinyl halide polymers can be used in the compositions of the present invention.

Vinyl halide polymers that are suitable for use in the coating compositions of the present invention are capable of forming films when applied to metal surfaces in the form of a lacquer, paste or dope and then cured. Such films can be self-supporting but they need not necessarily have that property. Hence these vinyl halide polymers can be described as "film forming." Suitable vinyl halide polymers preferably have specific viscosities (measured using a solution of one gram of the polymer dissolved in 100 milliliters of nitrobenzene or methyl isobutyl ketone), from 0.15 to 0.30 and, even more desirably, can have specific viscosities from 0.18 to 0.26 (measured as described). The preferred vinyl halide polymers are homopolymeric vinyl chloride polymers and copolymeric vinyl chloride polymers. The latter polymers preferably contain vinyl chloride copolymerized with vinyl acetate and vinylidene chloride.

Vinyl halide polymers that are suitable for use in those coating compositions of the present invention that are organosols or plastisols are preferably in a particulate form. Particulate vinyl halide polymers having an average particle size from 0.5 to 100 microns are preferred but it is even more desirable that the particulate vinyl halide polymer has a particle size from 0.5 to 20 microns.

Alkyd resins which are capable of forming a polymeric coating and which are useful in the coating compositions of the present invention include the various reaction products of polyhydric alcohols (e.g., glycerol, ethylene glycol, dipentaerythritol, trimethylol ethane, trimethylol propane, and sorbitol) and polybasic carboxylic acids (e.g., phthalic, maleic and sebacic acids) or the anhydrides thereof. Such alkyd resins can be modified with saturated or olefinically unsaturated monocarboxylic acids (e.g., fatty acids such as linseed, castor, tung or fish oil). Included among alkyd resins are those produced from olefinically unsaturated polybasic acids and polyhydric alcohols, which resins have been modified by reaction with vinylic compounds (e.g., styrene, alpha-methyl styrene or vinyl toluene).

Liquid organic diluents which may be employed in the coating compositions of this invention include any volatile liquid organic compound which is free of groups which substantially react with other components in the compositions at atmospheric temperatures and pressures. These diluents include volatile liquids such as hydrocarbons, chlorinated hydrocarbons, nitrogenated paraffins, ethers and alcohols. Liquid diluents which are solvents for the block copolymer and the coating-forming component are the easiest to use and hence are preferred. These liquid solvents when mixed with the other components provide liquid solutions which are simple to prepare and can be readily varied in concentration so as to allow the versatile use of the treating composition. However diluents which form suspensions or emulsions with the other components of the compositions are also useful. A single diluent or mixture of diluents can be used.

Liquids organic diluents used in the coating compositions of this invention include the saturated and unsaturated hydrocarbons, e.g., heptane, cyclohexane, heptene, mineral spirits (i.e., volatile hydrocarbons derived low boiling petroleum fractions), toluene, xylene, tetrahydronaphthalene, decahydronaphthalene and the like; the halogenated hydrocarbons, e.g., chlorobenzene, chloroform, carbontetrachloride, trichloroethylene, dichloroethyl ether and the like; the nitrated paraffins, e.g., nitropropane; hydrocarbon ethers, e.g., isopropyl ether, diphenyl ether, dioxane, and the like; hydrocarbon alcohols and alcoholethers, e.g., ethanol, butanol, ethylene glycol, diethylene glycol, and the monoalkyl ethers of ethylene, diethylene propylene and dipropylene glycol, monomethyl ether of ethylene glycol thereof, and the like.

Additives or modifying solvents can be incorporated into the coating compositions of this invention for modifying the properties of the compositions themselves or the films made therefrom. Such additives include ketones, aldehydes, esters, acids, pigments, other coloring agents, fillers, plasticizers, and resins (including silicone and organic resins). Typical additives are methyl isobutyl ketone, isophorone, heptaldehyde, amyl acetate, ethyl acetate. The additives can be reactive or non-reactive with the coating compositions. These additives, when added to the treating compositions, aid in modifying or enhancing film properties or in effecting economies by adding bulk to the films, if such is desired. Illustratively, the ketones, esters and aldehydes which are lacquer-type solvents are added to enhance anti-blush and anti-craze properties, act as leveling agents and in general aid the film-forming properties of the coating compositions. In addition, driers such as cobalt, naphthenate and lead resinate can be incorporated in the compositions. Moreover pigments such as titanium dioxide, zirconium oxide, zinc sulfide, antimony oxide, talc and silica can be added. Silicone resins enhance anti-wetting properties and hardness and promote faster drying of films laid down from compositions containing them. Many other additives for developing special properties and enhancing other properties of films are known to those skilled in the art of protective coatings and in accordance with the knowledge of those skilled in the art can be employed for similar purposes in the compositions of this invention.

The coating compositions of this invention can be formed in any convenient manner. Thus the coating-forming compound, diluent and any additives can be admixed in the sequence and in the apparatus used in producing conventional coating compositions. The siloxane-polyoxyalkylene block copolymer can then be mixed in any convenient manner with the admixture so formed to produce the coating composition of this invention.

A convenient manner for forming those compositions of this invention which contain polymeric coating-forming components that are produced by polymerizing monomers in a diluent is to form a mixture of the block copolymer and the diluent prior to producing the polymeric coating-forming component in the diluent. Thus, a block copolymer can be mixed with a diluent (e.g., water), a monomer can be introduced into the diluent (e.g., vinyl chloride or butadiene) and the monomer (either dissolved in the diluent, emulsified in the diluent or suspended in the diluent) can be polymerized to produce a composition of this invention (e.g., a latex composed of water, a block copolymer and a vinyl chloride homopolymer, or a butadiene polymer). In this method of producing the compositions of this invention the block copolymers can function as surface tension regulators, solubilizers in the diluent-monomer solution, emulsifying agents in the diluent-monomer emulsion or as suspension stabilizers to prevent excessive agglomeration of the polymers. Conventional additives (e.g., gelatin) can be added in such polymerization reactions.

The block copolymers can be used to partially or completely replace the organic surfactants and emulsifiers or dihydrocarbyl polysiloxanes which have been used in the polymerization processes of the prior art.

The function of the block copolymers in a specific polymerization depends upon the particular monomer or comonomers being polymerized, the nature of the diluent and also upon the amount of block copolymer(s) present either alone or in conjunction with organic surfactant(s).

Thus, they can be used to increase the solubility of the monomer or to aid in the dispersion of the monomer in emulsion or suspension polymerization.

The three kinds of liquid phase polymerizations in which the block copolymers can be of assistance are the solution, emulsion and suspension types.

In solution polymerization the system does not settle, the particle dimensions are molecular and the dispersion medium is a solvent. In this type of polymerization the organosilicone copolymer and the diluent form a solvent system in which the monomer is more slouble than in the diluent alone. The monomer may be soluble to varying degrees in the solvent system. Similarly, the solvent system may be a complete solvent, a partial solvent or a non-solvent for the polymer produced from the monomer. Thus, both the monomer and polymer may be soluble; the monomer may be soluble, but the polymer may be only partially soluble or insoluble; or the monomer may be partially soluble and the polymer may be insoluble.

An illustration of this last case is the polymerization of an aqueous, saturated solution of acrylonitrile in the presence of a water soluble catalyst. The system behaves initially as a solution polymerization. However, the polymer will precipitate because even low molecular weight polyacrylonitrile is insoluble in water, monomeric acrylonitrile or mixtures of the two. The organosilicone copolymers will keep the precipitated polymer in a dispersed phase, where polymerization, initiated in the solubilized monomer, is propagated. The partial solvent system may be chosen so that all polymers precipitate regardless of molecular weight, or only polymers of definite minimum or higher molecular weight will precipitate.

In emulsion polymerization the system is relatively non-settling, the particle sizes range from greater than molecular to about one micron, and the dispersion medium is essentially a non-solvent.

In suspension polymerization the system tends to settle, the particles have a dimension on the order of one micron or greater and the dispersion medium is essentially a non-solvent. In a suspension polymerization process the dispersed phase exists as discrete macroscopic beads during the monomer phase, during polymerization and after polymerization is completed. Basically the suspension system is related to the emulsion system in that the dispersion agents function as suspension stabilizers because of the particle size of the dispersed phase, rather than as emulsifying agents.

In the liquid-phase polymerization systems of this invention, basic components include the diluent, the dispersed phase, the block copolymers and usually a catalyst.

The diluent is inert to the monomer and in most systems consists of water of a high degree of purity and is present in from 20 to 98.999 parts by weight of the system. Hard water affects the properties of certain emulsifying agents, e.g., the soaps, by precipitating insoluble calcium or magnesium compounds. Therefore, in some cases it is desirable to use softened, completely deionized or distilled water. The density and solubility characteristics of the aqueous phase may be changed by water soluble monohydric and polyhydric alcohols, such as ethyl alcohol, ethylene glycol, glycerine, etc. Such modifiers are used in small quantities, usually less than 10 percent of the total amount of water.

The dispersed phase comprises the polymerizable material which can be a single monomer or a mixture of monomers, comonomers, etc. The polymerizable material may comprise up to about 75 percent or more of the total weight of the system. Preferably, it comprises from 1 to 50 percent of the total weight of the system. It will be understood by those skilled in the art that practical considerations will dictate the upper limit.

The preferred monomers of this invention are the vinyl monomers. It is known that vinyl monomers can be polymerized in the presence of compounds which yield free radicals. Such polymerizations are generally carried out in solution, in aqueous emulsion in the presence of emulsifying agents, or in aqueous suspension.

The process of this invention can be used to polymerize vinyl monomers containing the vinyl group

as well as mixtures of said vinyl monomers to produce homopolymers, copolymers, terpolymers, etc. For simplification, the term "polymer" as used in this invention includes the homopolymers as well as the polymers produced by the inter-polymerization of two or more polymerizable monomers; and the term "polymerization" includes the polymerization of a single monomer to produce a homopolymer as well as the polymerization of a mixture of two or more monomers to produce copolymers, terpolymers, etc. Illustrative of the vinyl monomers which can be polymerized to high molecular weight polymers are acrylic acid and its derivatives, such as acrylonitrile, methacrylonitrile, acrylamide, methacrylamide, methacrylic acid, glycidyl acrylate, isobutyl acrylate, 2-cyanoethyl acrylate, methyl methacrylate, ethyl methacrylate, ethyl acrylate, 2-ethylhexyl acrylate, and the like; the vinyl halides such as vinyl chloride, vinylidene chloride, and the like; the vinyl esters such as vinyl acetate, vinyl butyrate, vinyl benzoate, and the like; the vinyl ketones such as isopropenyl methyl ketone, vinyl phenyl ketone, vinyl methyl ketone, alpha-chlorovinyl methyl ketone, and the like; the vinyl thioethers such as vinyl ethyl sulfide, vinyl p-tolyl sulfide, divinyl sulfide, and the like. Other monomers which are capable of polymerization by the process of this invention are itaconic acid, styrene, divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. It will be and is obvious to a person skilled in the art that the concentrations of the monomers in the polymerizable mixture can be varied from a mixture consisting entirely of one monomer to mixtures consisting of two or more monomers in which the concentration of each monomer can be varied to suit the individual's purpose.

Among the polymers that can be produced by this invention are polyacrylonitrile, poly(vinyl chloride), poly(vinyl acetate), poly(vinylidene chloride), poly(methyl methacrylate), polystyrene, poly(ethyl acrylate), polyacrylic acid, poly(isopropenyl methyl ketone), acrylonitrile/vinylidene chloride copolymer, vinyl chloride/vinylidene chloride copolymer, vinyl chloride/vinyl acetate copolymer, acrylonitrile/vinyl chloride copolymer, acrylonitrile/vinyl acetate copolymer, acrylonitrile/vinyl chloride/vinylidene chloride terpolymer, and the like.

In the improved liquid phase polymerization process of this invention the block copolymer is present in an amount of from 0.001 to 30 parts by weight based on 100 parts by weight of the liquid phase reaction mixture. The preferred amount is from 0.1 to 5 parts by weight.

The block copolymers described above in connection with the coating compositions and polymerization process of this invention can be used in the polymerization process of this invention either alone or in conjunction with an organic surfactant or emulsifier.

From 0.01 to 20 parts by weight (based on 100 parts by weight of the liquid phase reaction mixture) of an organic surfactant or emulsifier may be used. It is preferred that, if used, the organic surfactant or emulsifier be present in a minor amount relative to the amount of block copolymer present.

The organic surfactants which may be used in conjunction with the organosilicone block copolymers are the anionic surfactants, such as the soaps and alkyl benzene sulfonates; cationic surfactants, such as the fatty amine salts and quaternary ammonium salts; nonionic surfactants, such as alkylphenol adducts of ethylene oxide and fatty alcohol adducts of ethylene oxide; and amphoteric surfactants which have both acidic and basic groups in their structure, such as amino and carboxyl radicals or amino and sulfonic radicals.

The function of the catalyst is to accelerate the rate of polymerization. Although it increases the rate of polymerization, it decreases the molecular weight of the polymer. Water soluble catalysts are preferred in emulsion systems, but insoluble catalysts may be used either alone or in conjunction with the water soluble ones. Some catalysts, such as ammonium persulfate, may also act as emulsifying agents. Although many emulsion systems polymerize readily without catalyst, the use of a catalytically effective amount of a catalyst is customary in commercial practice. Catalyst concentrations can be varied over the ranges known or obvious to those skilled in the art. Generally, from 0.01 to 1 part by weight, based on 100 parts by weight of the liquid phase reaction mixture, is sufficient to catalyze the polymerization.

Effective catalysts or initiators include the water soluble peracetates or their compounds, such as hydrogen peroxide, and urea peroxide. The inorganic perborates, persulfates and percarbonates are effective catalysts, as well as the ozonides, ozone and oxygen. In many polymerization systems, however, oxygen may act as an inhibitor rather than an accelerator, and then the system must be purged of oxygen.

There are many free radical polymerization initiators known to the art. They can be conveniently classified as redox and non-redox systems. The non-redox types can be either organic or inorganic compounds and become active initiators by thermal homolytic scission into their radical components. Examples of this type of initiator are acyl peroxides, alkyl hydroperoxides, alkyl peroxides, peresters, azo compounds, hydrogen peroxide, potassium persulfate, etc.

Most catalysts, such as the ones used in vinyl addition polymerization, are oxidizing agents. In many cases when such a polymerization is carried out in the presence of a reducing substance capable of reacting with the oxidizing agents, the reaction proceeds at a much higher rate. Such systems are called reduction activated polymerizations, since they are initiated by free radicals which are reactive intermediate products of the oxidation-reduction process. In this system the period of inhibition is likewise reduced. A number of oxidizable salts, metals, organic and inorganic compounds have been found to react as reduction activating agents. Some of these are iron, copper, sulfurous acid, sulfites, bisulfites, metabisulfites, hydrosulfites, sulfoxylates, thiosulfates and hydroquinone.

Redox catalyst systems ordinarily consist of two or more components which can be organic and/or inorganic compounds. They become active initiators by reactions of the components involving single-electron transfers. Some common redox systems include potassium persulfate-sodium bisulfite, hydrogen peroxide-iron salts, and cumene hydroperoxide-ferrous salts (with or without a complexing agent). The use of redox catalysts is to be preferred over non-redox systems because polymerization rates are significantly higher which in turn means greater productivity.

In the emulsion polymerization of vinyl monomers the monomer(s) can be emulsified in a non-solvent liquid, generally water, with the organosilicone block copolymers described above, in conjunction with organic emulsifiers if desired, and then polymerization can be carried out by adding the catalyst or catalyst system to the emulsion and agitating the mixture. Other addition sequences and reaction conditions known or obvious to those skilled in the art may also be used.

In many systems a polymerization regulator may be used in conjunction with the catalyst. These regulators appear to have a direct influence on the course of the polymerization, particularly in reducing branching or cross-linking, or even the molecular weight. Certain mercaptans like dodecylmercaptan, which is used in emulsion polymerization of butadiene copolymers, may be mentioned as an example. They are generally effective in amounts less than 1 part by weight, based on 100 parts by weight of the liquid phase reaction mixture.

In conjunction with the organosilicone copolymers and/or organic surfactants or emulsifiers, surface tension regulators, protective colloids and buffers can be used. Though not essential to all polymerizations, they lend uniformity and control to such processes and to the products.

During emulsion polymerization, the emulsion changes from a monomer to a polymer emulsion system with a consequent change in the interfacial tension between the two phases, dispersed and dispersing. Certain substances, usually aliphatic alcohols with chain lengths of about 5 to 10 carbon atoms, when added to many emulsion systems, have been found to maintain a favorable particle size distribution. These substances have been called surface tension regulators and are effective at less than about 0.5 percent of the monomer weight.

Protective colloids may be used, not only to prevent premature precipitation of either monomer or polymer emulsion, but also to prevent the coalescence of the viscous cohesive and adhesive particles that exist as an intermediate form in many polymerizations. Hydroxyethyl cellulose, sodium carboxy-methyl cellulose, polyvinyl alcohol, gelatin, starch, casein, alginates and related substances are commonly used as protective colloids. Some protective colloids, such as polyvinyl alcohol or sodium polyacrylate may also function as dispersion agents in certain emulsoid and suspensoid polymer systems. From 0.1 to 5 parts by weight, based on 100 parts by weight of the liquid phase reaction mixture are generally used.

As is well known, it is desirable to control the hydrogen ion concentration in most emulsion polymerization systems. Inhibition or retardation of the polymerization may result from large changes in pH caused by hydrolysis or changes in the monomers, the emulsifying agents or the catalysts. The standard buffers, such as phosphates, borates and acetates, may be used in required amounts, usually less than about 3 percent.

The temperature of the polymerization can vary widely and can be varied from about 5° C. up to about the boiling point of the polymerization mixture. Lower temperatures result in lower conversion rates at a constant total molar catalyst concentration; but this can be offset by increasing the total molar concentration of the catalyst charged to the polymerization mixture. Preferred temperatures are from about 25° C. to about 90° C. depending upon the polymerization system. Temperatures below about 25° C. are generally not attractive for commercial practice since the polymerization rate is too slow from an economical viewpoint.

The polymerization processes can be carried out in a continuous manner or in a batch-wise procedure. The resulting partially or completely polymerized emulsion may then be used for the coating compositions of this invention.

The coating compositions of this invention can be applied to surfaces and cured thereon to produce remarkably adherent protective coatings thereon. Applications can be made by spraying from aerosol bombs and from spray guns. In this instance, the usual chloroperfluorohydrocarbons, such as monochloroperfluoromethane, dichloroperfluoromethane, monochloroperfluoroethane, mixtures thereof and the like, and the volatile hydrocarbon gases, such as propane, the butanes, the pentanes, butene, amylenes, mixtures thereof and the like are used as propellants for the coating compositions. The propellant and the coating composition, as a solution, emulsion or in undiluted form, are enclosed in a suitable aerosol container or bomb. Any other suitable manner of application of the composition to the surface and any suitable manner of curing the composition can be employed. Thus the composition can be applied by brushing, dipping, knife coating, spraying, roller coating, or flooding and the compositions so applied can be cured (i.e., converted to solid, dry, non-tacky, continuous films or coatings) by exposure to atmospheric conditions or by heating to elevated temperatures. The latter method of curing is often preferred. The cure temperature is that conventionally used to cure the coating-forming component of the composition. Curing temperatures from 100° C. to 300° C. are usually preferred. Conventional cure catalysts can be employed, if desired. Curing involves fusion in the case of organosols and plastisols, volatilization of any volatile organic solvent and volatilization of any diluents and may also involve chemical reaction (e.g., polymerization).

The suitability of any given coating composition of this invention for producing a satisfactory coating on any particular surface is governed by the type of coating-forming component in the composition. In this respect, the best area of utility for any given composition of this invention is the same as that of a conventional coating composition containing the same coating-forming component. Thus compositions of this invention wherein the coating-forming components are epoxides are, like conventional coating compositions wherein the coating-forming components are similarly epoxides, well suited for forming protective coatings on metal surfaces.

Surfaces that are amenable to being coated with the coating compositions of this invention include metal, ceramic, cementitious, and wood surfaces.

Metal surfaces on which remarkably adherent coatings can be produced from the coating compositions of this invention include the metals below sodium in the electromotive series (e.g., aluminum, magnesium, iron, copper, chromium, nickel, lead, tin and zinc) as well as alloys of such metals (e.g., tin solder, brass, bronze and steel). Such metal surfaces need not be pretreated but, if desired the surfaces can be pretreated by conventional means (e.g., treated with phosphates to prevent corrosion). Such metal are solids at 25° C. and normally become corroded when in prolonged contact with heated aqueous saline solutions or hot humid air. The compositions are particularly applicable to coating surfaces of iron, brass and/or copper and the alloys of these metals.

Base members having ceramic surfaces can be coated with coating compositions of this invention. These surfaces include articles having surfaces formed by the firing or baking of earth containing clays or clay mixtures as is commonly known in the art. These articles or surfaces include crystalline calcium hydroxide, calcium carbonate, calcium sulfate monohydrate, $(CaSO_4)_2H_2O$, and the like, alone or as binders for the various fillers and other materials for providing special effects employed in the art, as for example, sand, asbestos, diatomaceous earths, kieselguhr, mica, wood flour, cotton flock, paper pulp, marble chips, silicates, carbonates, aluminates and metal oxides. Illustrative of such articles or surfaces are marble, limestone, sandstone, mortar, concrete, plaster of Paris, sea shells, terazzo, asbestos shingles and the like.

Base members having wood surfaces can be coated with compositions of this invention. Such wooden surfaces include pine, fruit wood, oak, plywood, spruce and the like.

The thickness of the coating produced on a surface with a coating composition of this invention is not narrowly critical. The desirable coating thickness is governed by the particular coating-forming component and the particular surface being coated in accordance with conventional coating practice.

The relative amounts of the coating-forming compound, siloxane-oxyalkylene block copolymer and liquid organic diluent present in the coating compositions of this invention are not narrowly critical and depend on various factors such as the chemical and physical properties of these components, the desired coating thickness to be produced, the number of times the composition is to be applied to produce a coating, and the like. In general, the useful and preferred amounts of these components are as follows:

|  | Parts by Weight | |
|---|---|---|
|  | Useful | Preferred |
| Coating-Forming Compound | 1 to 50 or 75 | 2 to 10. |
| Block Copolymer | 0.001 to 30 | 0.1 to 5. |
| Diluent | 20 to 98.999 | 85 to 97.9. |

The following examples illustrate the present invention:

EXAMPLE I

A solution was prepared containing 90 parts by weight of toluene and 10 parts by weight of a block copolymer having the formula:

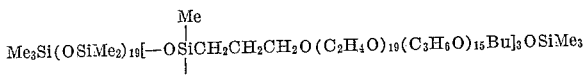

One milliliter of the copolymer-toluene solution was mixed with 100 milliliters of a commercially available acrylic paint ("Acryloid B–82") composed of 40 parts by weight of an acrylate ester polymer and 60 parts by weight of toluene. The acrylic paint had a specific gravity of 0.97 and a viscosity of about 560 centipoises at 30° C. The mixture was allowed to stand for 15 hours to permit the escape of bubbles. Then the mixture was flow-coated on a steel panel which had been previously cleaned with trichloroethylene. The coated panel was allowed to dry in air. The coating procedure was repeated with another portion of the acrylic paint to which no block copolymer had been added. Compared to the latter paint, the block copolymer-containing paint exhibited improved flow out, leveling and wetting.

The experiment described in the last paragraph was repeated employing one fifth the amount of the copolymer-toluene solution. Once again improved flow out, leveling and wetting were achieved.

EXAMPLE II

A pigment was produced by mixing 15.7 grams of ethylene glycol as a solvent, 172.5 grams of a vinyl acetate homopolymer, 8.8 grams of diethylene glycol dimethyl ether as a solvent ("Ansul Ether 141"), 11.8 grams of $C_4H_9OCH_2CH_2OCH_2CH_2OOCCH_3$ (butyl Carbital acetate) as a solvent and 47.5 grams of a 5 weight-percent solution of hydroxyethyl cellulose in water as a thickener ("Cellosize WP–4400"). Calcium carbonate (300 grams), titanium dioxide (100 grams) and water (370 grams) were mixed in a ball mill and, during the mixing, the pigment paste was added. The mixture was milled for 24 hours to produce a latex paint. To the paint was added a block copolymer having the formula:

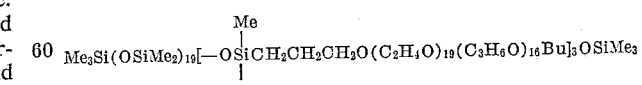

One thousand parts by weight of the block copolymer per million parts by weight of the paint were added. A steel panel was brush-coated with the paint and the panel was air-dried. The paint readily wetted the panel and the coating was free of fish-eyes. An otherwise identical paint free of the block copolymer wetted the panel poorly and produced a panel that was marred by fish-eyes.

Better wetting and freedom from fish-eyes were also obtained with the above-described latex paint when a block copolymer was employed having the formula:

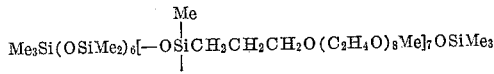

EXAMPLE III

A coating composition of this invention is produced by mixing 100 parts by weight of the diglycidyl ether of 2,2-bis(p-hydroxyphenyl)propane having an epoxy equivalency of 2, 10 parts by weight of diethylene triamine, 10 parts by weight of methyl ethyl ketone and 1 part by weight of a block copolymer having the formula:

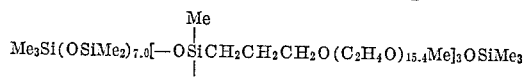

$Me_3Si(OSiMe_2)_{7.0}[-OSi(Me)CH_2CH_2CH_2O(C_2H_4O)_{15.4}Me]_3OSiMe_3$

The coating composition is applied to a steel plate as a coating using a 10-mil drawdown blade. The coating is cured by allowing it to stand at room temperature for 24 hours to produce a hard, infusible coating. The coating composition is observed to wet the steel surface better than an otherwise identical block copolymer-free coating composition.

EXAMPLE IV

An alkyd resin is produced by reacting stoichiometric amounts of phthalic acid and ethylene glycol (one COOH group per —OH group). The resin (50 parts by weight) is emulsified with 50 parts by weight of water containing casein as an emulsifying agent and 0.5 part by weight of the block copolymer described in Example III. The emulsion is milled with titanium dioxide (30 parts by weight), flake mica (10 parts by weight) and silica (100 parts by weight) to produce a paint. The presence of the block copolymer enhances the stability of the emulsion and aids in securing the compatibility of the emulsion and the other ingredients.

EXAMPLE V

By adding 0.1 part by weight of either of the block copolymers described in Example II to 100 parts by weight of a solution formed by dissolving 5 parts by weight of gamma-aminopropyltriethoxysilane in 95 parts by weight of water there is produced an improved silver-coating composition (e.g., possessing improved wetting properties).

EXAMPLE VI

Two compositions of this invention (Compositions A and B) are prepared by mixing the following components:

| Component | Amount (parts by weight) | |
|---|---|---|
| | Composition A | Composition B |
| Vinyl Chloride Polymer [1] | 17.5 | 15.0 |
| Titanium Dioxide [2] | 11.3 | 0.0 |
| Aluminum Powder [2] | 0.0 | 6.7 |
| Dioctyl Phthalate (plasticizer) | 1.3 | 1.5 |
| Tricresyl Phosphate (plasticizer) | 2.5 | 0.0 |
| Methyl Isobutyl Ketone (solvent) | 33.1 | 33.4 |
| Toluene (diluent) | 33.1 | 38.4 |
| Antimony Oxide [2] | 1.2 | 0.75 |
| Block Copolymer Described in Example I | 0.35 | 0.75 |

[1] A copolymeric vinyl chloride polymer that is composed of 86 parts by weight of copolymerized vinyl chloride per 100 parts by wieght of the polymer and 14 parts by weight of copolymerized vinyl acetate per 100 parts by weight of the polymer. It has a specific viscosity of 0.56 (measured using one gram of the polymer dissolved in 100 milliliters of methyl isobutyl ketone).
[2] To render coating opaque.

Compositions A and B are applied to different cold rolled steel surfaces by conventional spray coating methods. The surfaces so treated are allowed to air dry for 30 minutes and were then heated for 15 minutes at 200° F. to produce adherent coatings. The composition exhibit improved compatibility and wetting action owing to the presence of the block copolymer.

The following examples illustrate the improved liquid phase polymerization process of this invention:

EXAMPLE VII

Eight vinyl acetate/2-ethylhexylacrylate copolymer emulsions, differing in the nonionic surfactant they contained, were prepared from the following formulation:

| Ingredient: | | Wt. percent |
|---|---|---|
| Aqueous charge | Deionized water | 46.61 |
| | Nonionic surfactant [1] | 0.8 |
| | Sodium tetradecyl sulfate (anionic surfactant) | 0.2 |
| | Potassium persulfate (catalyst) | 0.29 |
| | Borax (buffer) | 0.35 |
| | Hydroxyethyl cellulose (protective colloid) [of 75–140 cps. viscosity grade as a 5% aqueous solution] | 0.75 |
| Monomer charge | Vinyl acetate containing 200 p.p.m. hydroquinone inhibitor | 46.75 |
| | 2-ethylhexyl acrylate | 8.25 |
| | | 100.00 |

[1] The nonionic surfactants used were:
(A) Control-alkyl aryl polyethylene glycol—"Tergitol" NPX, a product of Union Carbide Corporation.
(B) Me₃SiO—[MeO(C₂H₄O)₇C₃H₆SiMeO]SiMe₃
(C) Me₃SiO—[Me₂SiO—]₂[MeO(C₂H₄O—)₃ C₂H₄SiMeO—]₂.₈SiMe₃
(D) Me₃SiO[Me₂SiO]₂₁[BuO(C₂H₄O)₁₈ (C₃H₆O)₁₄C₃H₆SiMeO]₃.₅SiMe₃
(E) Me₃SiO[Me₂SiO]₃.₅[MeO(C₂H₄O)₁₆C₃H₆SiMeO]₃.₅SiMe₃
(F) Me₃SiO[MeO(C₂H₄O)₇C₃H₆SiMeO]₁.₅SiMe₃
(G) Me₃SiO[Me₂SiO]₂[MeO(C₂H₄)₁₆C₃H₆SiMeO]₂.₈SiMe₃
(H) Me₃SiO[Me₂SiO]₃.₅[MeO(C₂H₄O)₇C₃H₆SiMeO]₃.₅SiMe₃

Each polymerization was carried out in a three-liter resin reaction flask equipped with a variable speed agitator, nitrogen purge, reflux condenser, addition funnel, thermometer, and controlled heating mantle. The aqueous charge was added to the flask and agitated. The monomer charge was slowly added to the flask through a dropping funnel so as to maintain a low concentration of monomer in the liquid phase reaction mixture. The temperature of the mixture was maintained at 78 to 80° C. throughout the reaction. It was noted that the reaction mixtures containing block copolymers foamed less than the control during the polymerization. Those polymers made with the block copolymers had finer particle size than the control.

All the emulsions exhibited mechanical stability when subjected to 30 minutes of agitation at high speed in a Waring Blendor.

All the emulsions were stable when subjected to the following test: a 10 gm. sample of the latex was diluted with 20 gm. of water and then mixed with 100 ml. of an aqueous solution containing 1% CaCl₂.

When applied to a substrate, all the polymer emulsions dried in air to clear films.

EXAMPLE VIII

A latex was produced from the formulation and according to the procedure of Example VII, with the exception that a nonionic surfactant of the general formula:

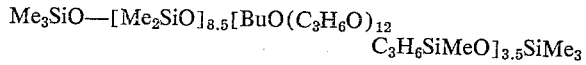

Me₃SiO—[Me₂SiO]₈.₅[BuO(C₃H₆O)₁₂ C₃H₆SiMeO]₃.₅SiMe₃ was employed. This latex had finer particle size than that made with the control surfactant of Example VII and was stable when subjected to the CaCl₂ test described in Example VII.

EXAMPLE IX

Two latexes were produced from the formulation and according to the procedure of Example VII, with the exception that a nonionic surfactant of the general formula:

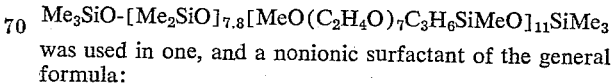

Me₃SiO-[Me₂SiO]₇.₈[MeO(C₂H₄O)₇C₃H₆SiMeO]₁₁SiMe₃ was used in one, and a nonionic surfactant of the general formula:

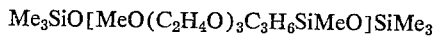

Me₃SiO[MeO(C₂H₄O)₃C₃H₆SiMeO]SiMe₃ was used in the other.

The latexes had finer particle size than that made with the control surfactant of Example VII and were stable when subjected to 30 minutes of agitation in a Waring Blendor.

EXAMPLE X

An emulsion polymer was made according to the formulation and procedure described in Example VII except that the only emulsifier used was $Me_3SiO[MeO(C_2H_4O)_7C_3H_6SiMeO]SiMe_3$ at 0.8%. In this experiment the potassium persulfate catalyst was increased to 0.58%. The amount of water was decreased to maintain the concentrations of the other ingredients. A useful polymer emulsion was produced. It had a Brookfield viscosity of 795 cps. at 25° C., a particle size of 2000 A. and exhibited mechanical and salt stability when subjected to the Waring Blendor and $CaCl_2$ tests described in Example VII. The copolymer emulsion made with control surfactant (A) according to the formulation and procedure of Example VII had a Brookfield viscosity of 1,000 cps., a particle size of 4000 A. (average) and exhibited mechanical and salt stability when subjected to the Waring Blendor and $CaCl_2$ tests described in Example VII.

It was subsequently found that useful, stable polymers were obtained by using only 0.42% or even 0.40% of the block copolymer and 0.29% potassium persulfate. The amount of water was increased to maintain the concentration of the other ingredients. The amount of foaming was low in comparison to that encountered when using organic surfactants. The latex containing 0.40% of the block copolymer had a Brookfield viscosity of 335 cps. at 25° C., a particle size of 1800 A. and exhibited mechanical and salt stability when subjected to the Waring Blendor and $CaCl_2$ tests described in Example VII.

A similar latex was made by polymerizing the formulation of Example VII which contained 0.40% of Control (A) surfactant as the only surfactant. The emulsion was stable but seedy, and hence of doubtful utility in a formulated product.

EXAMPLE XI

A vinyl acetate/2-ethylhexylacrylate copolymer emulsion was produced from a formulation as given in Example VII. As the nonionic surfactant $Me_3SiO[MeO(C_2H_4O)_7C_3H_6SiMeO]SiMe_3$ was used. The monomers were added through one dropping funnel and a catalyst-deionized water mixture was added through another dropping funnel to an agitated mixture of monomer, emulsifying agents, colloid, buffer and deionized water. The temperature of the mixture was maintained at 78–80° C. throughout the reaction. The resulting product was a stable latex.

EXAMPLE XII

Emulsion polymers of the acrylic type were prepared from the following formulation.

Monomer charge
{ 240 grams methyl methacrylate
  120 grams ethyl acrylate
  20 grams acrylic acid Aqueous charge
{ 730 grams deionized water
  2 grams ammonium persulfate } Redox catalyst system
  1 gram sodium bisulfite
  1 gram $Me_3SiO[MeO(C_2H_4O)_7C_3H_6SiMeO]SiMe_3$
  7 grams sodium lauryl sulfate (anionic surfactant)

The aqueous charge was added to a two-liter glass resin reaction flask immersed in a water bath and equipped with a reflux condenser, a thermometer, a power-driven glass stirring rod with Teflon paddle, a one-liter dropping funnel, and a nitrogen inlet tube. The aqueous charge was stirred (450 r.p.m.) while being heated to 40° C. to form a clear homogeneous solution. The vessel was slowly purged with a stream of nitrogen above the liquid level. The monomeric charge was added to the flask at a uniform rate, and all of it was added within two hours. The reaction temperature was held at about 42° C. After the last addition of monomer, the reaction was allowed to continue for 30 minutes to insure complete polymerization. The latex was cooled to 25° C. and neutralized to pH 8 by the dropwise addition of concentrated (28%) amonium hydroxide. The solids content of the latex was 36%. The emulsion had excellent mechanical stability and a particle size distribution of 400–1500 A.

It was found that if an alkyl polyethylene glycol ("Tergitol" TMN, a product of Union Carbide Corporation) is substituted for the nonionic silicone surfactant, it is necessary to use six times as much of it in order to achieve an emulsion having equivalent properties.

EXAMPLE XIII

*Preparation of a styrene-acrylate adhesive latex using a silicone emulsifier*

A styrene-acrylate adhesive latex was made from the following formulation:

Charge—

Aqueous: | Grams
--- | ---
Water (deionized) | 97.9
$Me_3SiO[MeO(C_2H_4O)_7C_3H_6SiMeO]SiMe_3$ (nonionic surfactant) | 12
Sodium lauryl sulfate (anionic surfactant) | 6
Redox catalyst { Ammonium persulfate | 4
                 { Sodium bisulfite | 2

Monomer:
2-ethylhexyl acrylate (containing 200 p.p.m. of the monomethyl ether of hydroquinone as inhibitor) --- 560
Styrene --- 200
Acrylic acid (glacial) --- 35

The ingredients of the aqueous charge were added to a 3-liter glass resin reaction flask immersed in a water bath and equipped with a reflux condenser, a thermometer, a power-driven glass stirring rod with glass paddle, a 1-liter dropping funnel and a nitrogen inlet tube. The addition followed the order given above, with the sodium bisulfate (in 20 ml. of water) being added just prior to the start of the monomer addition. The aqueous charge was stirred at 100–120 r.p.m. and heated to 40° C. to form a clear homogeneous solution. The vessel was slowly purged with a stream of nitrogen above the liquid level. The monomer charge was added at a uniform rate (5 to 7 ml. per minute) during a period of 2½ hours. The polymerization was carried out at a temperature of 40–45° C. During the polymerization, an exotherm of approximately 3–4 degrees centigrade was noted. After the last addition of monomer, the reaction was allowed to continue for one hour to insure complete polymerization. The latex was then cooled to 25° C. and neutralized to pH 7.0 by the dropwise addition of a 28% ammonium hydroxide solution. The latex exhibited good stability at a workable viscosity.

Latex properties:
pH --- 7.0
Viscosity, centipoise at 25° C. (Brookfield model RVT No. 3 spindle at 20 r.p.m.) --- 1700
Total solids ---percent-- 46

EXAMPLE XIV

A vinyl acetate/2-ethylhexyl acrylate latex was made from the following information:

Aqueous charge: Weight, grams
- Deionized water _____ 279.00
- Me$_3$SiO[MeO(C$_2$H$_4$O)$_7$C$_3$H$_6$SiMeO]SiMe$_3$ (as a 10% aqueous solution) [nonionic surfactant] _____ 40.00
- Potassium persulfate [catalyst] (as a 4% aqueous solution) _____ 72.10
- Borax [buffer] _____ 3.5
- Hydroxyethyl cellulose [protective colloid] (of 75–140 cps. viscosity grade measured as a 5% aqueous solution at 25° C.) ____ 7.5

Monomer charge:
- Vinyl acetate (containing 200 p.p.m. hydroquinone inhibitor) _____ 467.5
- 2-ethyl hexyl acrylate _____ 82.5

The ingredients of the aqueous charge were added to a 3-liter glass resin reaction flask immersed in a water bath and equipped with a reflux condenser, a thermometer, a power-driven glass stirring rod with glass paddle, a 1-liter dropping funnel and a nitrogen inlet tube. The addition followed the order given above. The mixture was stirred at 100–140 r.p.m. and heated to 60° C. At this temperature mixed monomer addition was slowly begun.

The flask was purged with a stream of nitrogen above the liquid level. The mixed monomer charge was added at a uniform rate during a period of 2½ hours. The polymerization was carried out at a temperature of 80° C. After the last addition of mixed monomer, the reaction was allowed to continue for ½ hour to insure complete polymerization. The latex was then cooled to 30° C. and discharged from the reaction flask.

EXAMPLE XV

*Polymerization of ethyl acrylate by a redox catalyst using a silicone emulsifier*

Charge—
Aqueous: Grams
- Deionized water _____ 225.0
- Sodium alkyl aryl (28% active)[1] _____ 8.4
- Polyether sulfonate _____ 2.0
- Me$_3$SiO[MeO(C$_2$H$_4$O)$_7$C$_3$H$_6$SiMeO]SiMe$_3$
- Redox catalyst:
  - Ammonium persulphate _____ 0.5
  - Ferrous sulphate heptahydrate_ 0.006
  - Sodium bisulphite _____ 0.5

Monomer:
- Ethyl acrylate _____ 100.0

[1] Triton X-200, Rohm and Haas.

The ingredients of the aqueous charge are added to a 1-liter glass resin reaction flask immersed in a water bath and equipped with a reflux condenser, a thermometer, a power-driven stirring rod with glass paddle and a nitrogen inlet tube. Addition follows the order given above, with the sodium bisulfite (in 20 ml. of water) being added just prior to the monomer addition. The monomer addition is made, and the mixture is stirred at a uniform rate of 120–140 r.p.m. while the reaction vessel is purged with a stream of nitrogen below the liquid level. The liquid is purged for approximately 10 minutes. With very little heating the pot temperature rises to 90° C. after an induction period of 10–15 min. The reaction mixture is kept at 90° C. for three hours to insure complete polymerization. The latex is then allowed to cool to 30° C. and the contents of the reaction flask are discharged.

In the above formulation it is possible to use the block copolymer alone in an amount of 3.5 gm.

EXAMPLE XVI

*Preparation of polyvinyl acetate latexes and formulation of interior white wall paints therefrom*

The advantage of a block copolymer over conventional non-ionic emulsifiers is shown in the following two tables on polyvinyl acetate/2-ethyl hexyl acrylate latexes which were prepared according to the procedure given in Example VII.

TABLE I.—POLYVINYL ACETATE LATEX FORMULATIONS

| Ingredient | Weight Percent | | |
|---|---|---|---|
| | Block Copolymer/ Anionic Latex | Block Copolymer Latex | Control Latex |
| Me$_3$SiO[MeO(C$_2$H$_4$O)$_7$C$_3$H$_6$SiMeO]SiMe$_3$ | 0.40 | 0.40 | |
| Non-Ionic Surfactant [1] | | | 0.80 |
| Anionic Surfactant [2] | 0.10 | | 0.20 |
| Deionized Water | 43.11 | 43.21 | 42.61 |
| Vinyl Acetate (containing 200 p.p.m. monomethyl ether of hydroquinone as inhibitor) | 46.75 | 46.75 | 46.75 |
| 2-Ethyl Hexyl Acrylate | 8.25 | 8.25 | 8.25 |
| Potassium Persulfate | 0.29 | 0.29 | 0.29 |
| Borax | 0.35 | 0.35 | 0.35 |
| Hydroxyethyl Cellulose (of 75–140 cps. viscosity grade as a 5% aqueous solution) | 0.75 | 0.75 | 0.75 |
| | 100.00 | 100.00 | 100.00 |
| Reaction Time, hrs. | 2½ | 2½ | 2½ |
| Reaction Temp., ° C. | 80 | 80 | 80 |

[1] Alkyl aryl polyethylene glycol—"Tergitol" NPX, a product of Union Carbide Corporation.
[2] Sodium tetradecyl sulfate—"Tergitol" 4, a product of Union Carbide Corporation.

LATEX PROPERTIES

From the following table it will be noted that the block copolymer proved effective at less than half the total emulsifier concentration.

TABLE II.—PROPERTIES OF POLYVINYL ACETATE LATICES

| | Block Copolymer/ Anionic Latex | Block Copolymer Latex | Control Latex |
|---|---|---|---|
| Solids, wt. percent | 55 | 55 | 55 |
| Viscosity, 25° C., cps. (Brookfield, Model LVT, No. 2 Spindle, 30 r.p.m.) | 1,800 | 1,000 | 2,300 |
| Mean Particle Size, A | 4,000 | 3,800 | 4,300 |
| Emulsion Stability (30 min. in Waring Blendor, high speed) | [1] Stable | Stable | Stable |
| Salt Stability [2] | Stable | Stable | Stable |

[1] No creaming or separation.
[2] No coagulation when mixed with equal volume of aqueous solution of 0.1% calcium chloride.

PAINT FORMULATION

The block copolymer/anionic latex and the Control Latex were separately compounded into the interior white wall paint formulation given below. The water "Tamol," preservative, pigments "Tergitol" NPX and ethylene glycol were charged to a Cowles Dissolver and ground for about 25 minutes. The remaining ingredients were added in the order shown with continuous mixing.

TABLE III.—POLYVINYL ACETATE INTERIOR WALL PAINT (~20% Solids)

| Ingredients | Weight Percent | |
|---|---|---|
| | Block Copolymer/Anionic Latex | Control Latex |
| Block Copolymer/Anionic Latex | 23.6 | |
| Control Latex | | 23.6 |
| Water | 12.56 | 12.56 |
| "Tamol" 731 (25%) [a] | 0.7 | 0.7 |
| Tergitol Nonionic NPX [b] | 0.2 | 0.2 |
| Ethylene Glycol | 1.7 | 1.7 |
| "Troyson" PMA-30 Preservative [c] | .04 | .04 |
| Butyl Cellosolve Acetate [b] | 1.3 | 1.3 |
| Bubble Breaker 746 [d] | 0.4 | 0.4 |
| "Unitane" O R-560 Titanium Dioxide [e] | 13.1 | 13.1 |
| Gold Bond "R" Silica [f] | 13.1 | 13.1 |
| "Al-Sil-Ate" W Calcined Clay [g] | 11.4 | 11.4 |
| Cellosize Hydroxyethyl Cellulose (2%) [b] | 21.9 | 21.9 |
| | 100.0 | 100.0 |

[a] Rohm & Haas Co., Philadelphia, Pa.
[b] Union Carbide Corporation, Chemical Div., New York, N.Y.
[c] Troy Chemical Co., Newark, New Jersey.
[d] Balab, Burlingame, California.
[e] American Cyanamid Co., Wayne, New Jersey.
[f] Tamms Industries, Inc., Chicago, Illinois.
[g] Freeport Kaolin Co., New York, N.Y.

PAINT EVALUATION

The above paint formulations were coated on standard paint evaluation cards and checked for scrub resistance, leveling, and adhesion. Average film thickness was 5±0.2 mils.

*Scrub resistance.*—Coated cards were air-dried seven days before testing. Cards were brushed with a 20% slurry of Lava soap in water. Scrub resistance with determined by comparison of wear after the same number of cycles on a Gardner abrasion tester.

The visually evaluated results are summarized in Table IV.

TABLE IV

| Number of Brushing Cycles | Paint from Control Latex | Paint from Block Copolymer/Anionic Latex |
|---|---|---|
| 150 | Substrate showing through about ¼ of painted area. | No substrate showing through painted area. |
| 200 | Substrate showing through about ½ of painted area. | Do. |
| 250 | Substrate showing through about 90% of painted area. | Substrate showing through about 10% of painted area. |
| 300 | Substrate showing through almost all of painted area. | Substrate showing through about ½ of painted area. |

*Leveling.*—Visual inspection indicated that the block compolymer gave excellent leveling. No "fish-eyes" or other surface irregularities were present.

*Adhesion.*—Good adhesion was noted on these test panels for the paint containing the block copolymer. This paint also showed qualitatively better adhesion to a glass plate, a standard of performance employed by the industry.

EXAMPLE XVII

Two dry-bright floor polish formulations (A & B) were made by mixing together the ingredients of the following formulation. The formulations differed in the nonionic surfactant used to make the latex.

| Ingredient: | Parts by weight |
|---|---|
| Latex 18% solids [1] | 75 |
| Durez Resin 15546 18% solids [2] | 5 |
| Durez Resin 19788 18% solids [3] | 5 |
| AC-629 18% solids [4] | 15 |
| | 100 |

To the resulting mixture was added 0.68 wt. percent KP-140 [5] and 1.35 wt. percent Carbitol.[6]

[1] Formulation A contained a latex made with the Control A surfactant of Example VII. Formulation B contained a latex made with block copolymer B of Example VII. Each latex was made according to the formulation and procedure of Example VII. Each latex was then reduced from its original 36% solids content to 18% by dilution with deionized water before being used in the above formulation.
[2] and [3] Both are polyester resins, products of Hooker Chemical Co. Each was added to warm water to form 18% solutions, and the pH of each was adjusted to 9 with 28% NH₄OH.
[4] A polyethylene emulsion based on morpholine-oleic acid and produced by Allied Chemical Co. It was used as an emulsion of 18% solids.
[5] Tributoxyethyl phosphate, a product of Food Machinery Corp.
[6] A product of Union Carbide Corporation.

When applied to flooring, dry-bright floor polish formulation B (containing the block copolymer) produced a higher gloss and better resistance to water spotting than formulation B (containing the organic non-ionic surfactant).

What is claimed is:
1. The method which comprises forming a liquid phase reaction mixture comprising (1) from 1 to 75 parts by weight of at least one monomer selected from the group consisting of vinyl acetate, 2-ethylhexyl acrylate, methyl methacrylate, acrylic acid, styrene, ethyl acrylate, glycidyl acrylate, and itaconic acid, (2) from 0.001 to 30 parts by weight of a block copolymer composed of (a) at least one siloxane block containing at least two siloxane units represented by the formula:

$$R_b SiO_{4-b/2}$$

wherein R contains from one to about twenty-two carbon atoms inclusive and is selected from the class consisting of monovalent hydrocarbon groups and divalent hydrocarbon groups and $b$ has a value from 1 to 3 inclusive; said siloxane block containing at least one of said siloxane units wherein at least one R group is a divalent hydrocarbon group, and (b) at least one oxyalkylene block containing at least two oxyalkylene groups represented by the formula —R'O—, wherein R' is an alkylene group containing from two to about ten carbon atoms inclusive, said siloxane and oxyalkylene blocks being interconnected by a divalent hydrocarbon group, said copolymer containing from 5 to 95 parts by weight of siloxane blocks per 100 parts by weight of the copolymer and from 5 to 95 parts by weight of the oxyalkylene blocks per 100 parts by weight of the copolymer, and (3) from 20 to 98.999 parts by weight of a liquid diluent selected from the group consisting of water and liquid organic diluents, said parts by weight being based on 100 parts by weight of said liquid phase reaction mixture; and subjecting each such olefinically unsaturated organic compound to polymerization in said liquid phase reaction mixture to produce said polymer dispersed in said diluent.

2. The polymerization process according to claim 1 in which the block copolymers have the general formula:

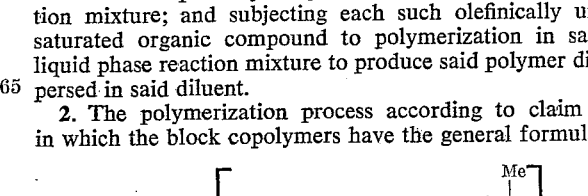

wherein Me represents the methyl group (CH₃—), $m$ has a value of from 0 to 25 inclusive, $n$ has a value of from 1 to 15 inclusive, $x$ has a value of from 3 to 25 inclusive, $y$ has a value of from 0 to 25 inclusive, $z$ has a value of from 2 to 3 inclusive, and R″ is an alkyl group containing from 1 to 4 carbon atoms inclusive.

3. The polymerization process according to claim 1 in which the block copolymer is selected from the group consisting of:

$Me_3SiO—[MeO(C_2H_4O)_7C_3H_6SiMeO]SiMe_3$,
$Me_3SiO—[Me_2SiO]_2[MeO(C_2H_4O—)_3C_2H_4SiMeO—]_{2.8}SiMe_3$,
$Me_3SiO[Me_2SiO]_{21}[BuO(C_2H_4O)_{18}(C_3H_6O)_{14}C_3H_6SiMeO]_{3.5}SiMe_3$,
$Me_3SiO[Me_2SiO]_{8.5}[MeO(C_2H_4O)_{16}C_3H_6SiMeO]_{3.5}SiMe_3$,
$Me_3SiO[MeO(C_2H_4O)_7C_3H_6SiMeO]_{1.5}SiMe_3$,
$Me_3SiO[Me_2SiO]_2[MeO(C_2H_4O)_{16}C_3H_6SiMeO]_{2.8}SiMe_3$,
$Me_3SiO[Me_2SiO]_{8.5}[MeO(C_2H_4O)_7C_3H_6SiMeO]_{3.5}SiMe_3$,
$Me_3SiO—[Me_2SiO]_{7.8}[MeO(C_2H_4O)_7C_3H_6SiMeO]_{11}SiMe_3$, and
$Me_3SiO[MeO(C_2H_4O)_3C_3H_6SiMeO]SiMe_3$.

4. The polymerization process according to claim 1 in which the block copolymer contains 5 to 50 parts by weight of the siloxane blocks and from 50 to 95 parts by weight of the oxyalkylene blocks per 100 parts by weight of said copolymer.

5. The polymerization process according to claim 1 in which the block copolymer is present in an amount of from 0.1 to 5 parts by weight based on 100 parts by weight of the reaction mixture.

6. The polymerization process according to claim 1 in which the olefinically unsaturated organic compound is present in an amount of from 1 to 50 parts by weight based on 100 parts by weight of the liquid phase reaction mixture.

7. The polymerization process according to claim 1 in which the olefinically unsaturated organic compound is present in an amount of from 2 to 10 parts by weight based on 100 parts by weight of the liquid phase reaction mixture.

8. The polymerization process according to claim 1 in which the diluent comprises water, and the polymer which is produced is obtained as an emulsion in said diluent.

9. The polymerization process according to claim 1 in which the polymerization is conducted at a temperature of from 25 to 90° C.

10. A polymerization process according to claim 1 in which an anionic surfactant is used in conjunction with the block copolymer in an amount of from 0.01 to 20 parts by weight based on 100 parts by weight of the liquid phase reaction mixture.

11. A polymerization process according to claim 1 in which an anionic surfactant selected from the group consisting of sodium tetradecyl sulfate and sodium lauryl sulfate is used in conjunction with the block copolymer in an amount of from 0.01 to 20 parts by weight based on 100 parts by weight of the liquid phase reaction mixture.

12. A polymerization process according to claim 1 in which there is used a catalytically effective amount of a catalyst selected from the group consisting of oxidizing agents and redox catalysts.

References Cited

UNITED STATES PATENTS

| 2,846,458 | 8/1958 | Haluska | 260—46.5 |
| 2,868,824 | 6/1959 | Haluska | 260—46.5 |
| 2,990,377 | 6/1961 | May | 252—312 |

FOREIGN PATENTS

| 924,424 | 4/1963 | Great Britain. |

OTHER REFERENCES

Journal of Polymeric Science, vol. 8, No. 3, pp. 258–260 (1952).

Schwartz: "Surface Active Agents," vol. I. pp. 12, 13, 401, Interscience Publishers, 1949.

MURRAY TILLMAN, *Primary Examiner.*

SAMUEL H. BLECH, *Examiner.*

N. F. OBLON, J. L. WHITE, *Assistant Examiners.*

UNITED STATES PATENT OFFICE
CERTIFICATE OF CORRECTION

Patent No. 3,342,766                              September 19, 1967

Dexter P. Huntington

It is hereby certified that error appears in the above numbered patent requiring correction and that the said Letters Patent should read as corrected below.

Column 24, lines 68 to 71, for the right-hand portion of the formula reading $$\begin{array}{c}\text{Me}\\|\\\text{Si}\\|\end{array} \quad \text{read} \quad \begin{array}{c}\text{Me}\\|\\\text{SiO}-\\|\end{array}$$

Signed and sealed this 24th day of September 1968.

(SEAL)

Attest:

Edward M. Fletcher, Jr.                          EDWARD J. BRENNER

Attesting Officer                                       Commissioner of Patents